D. M. GRAHAM.
METHOD OF TREATING WHEAT AND THE LIKE GRAIN.
APPLICATION FILED AUG. 25, 1915. RENEWED MAY 24, 1919.
1,332,495.
Patented Mar. 2, 1920.
10 SHEETS—SHEET 1.
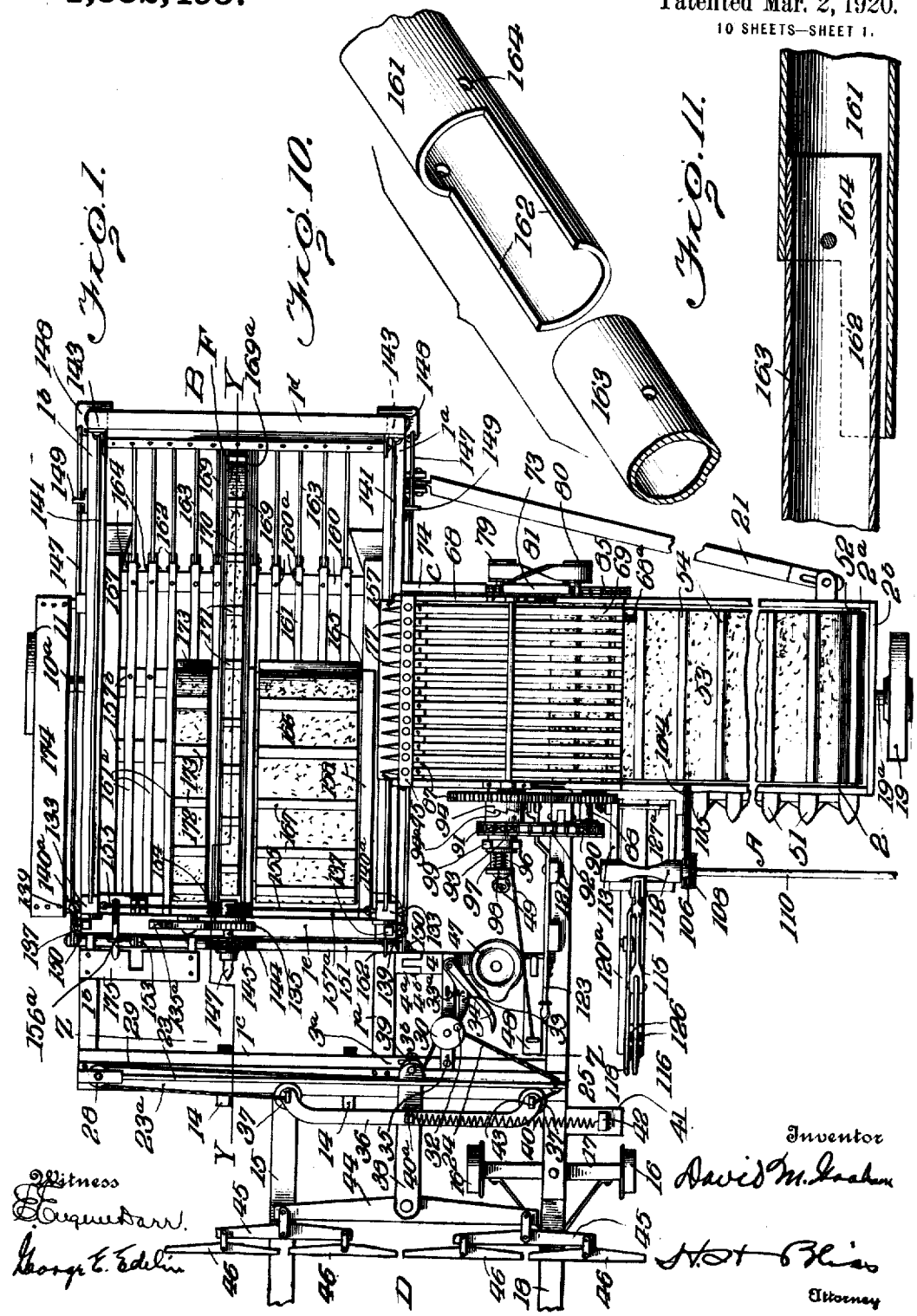

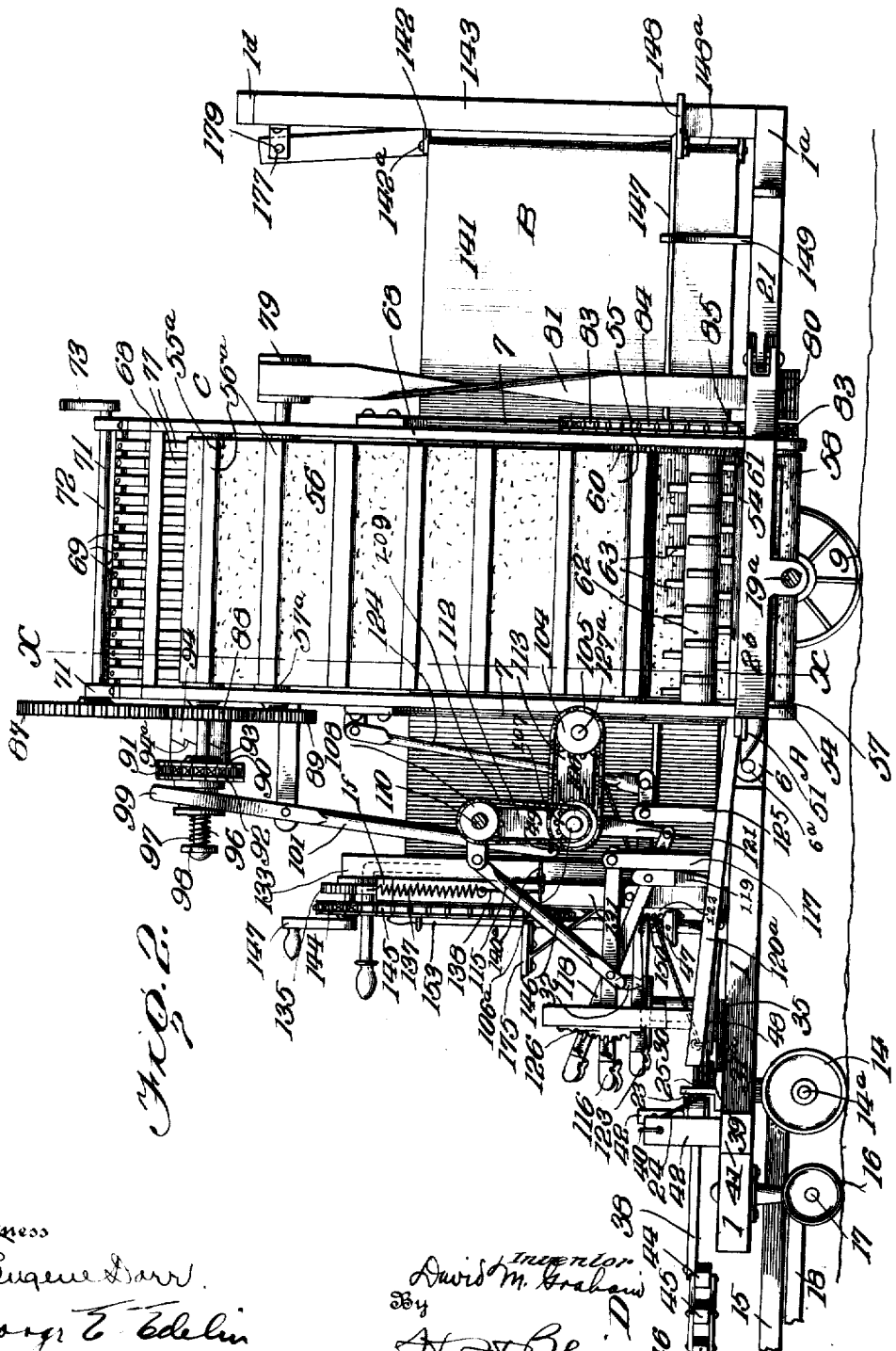

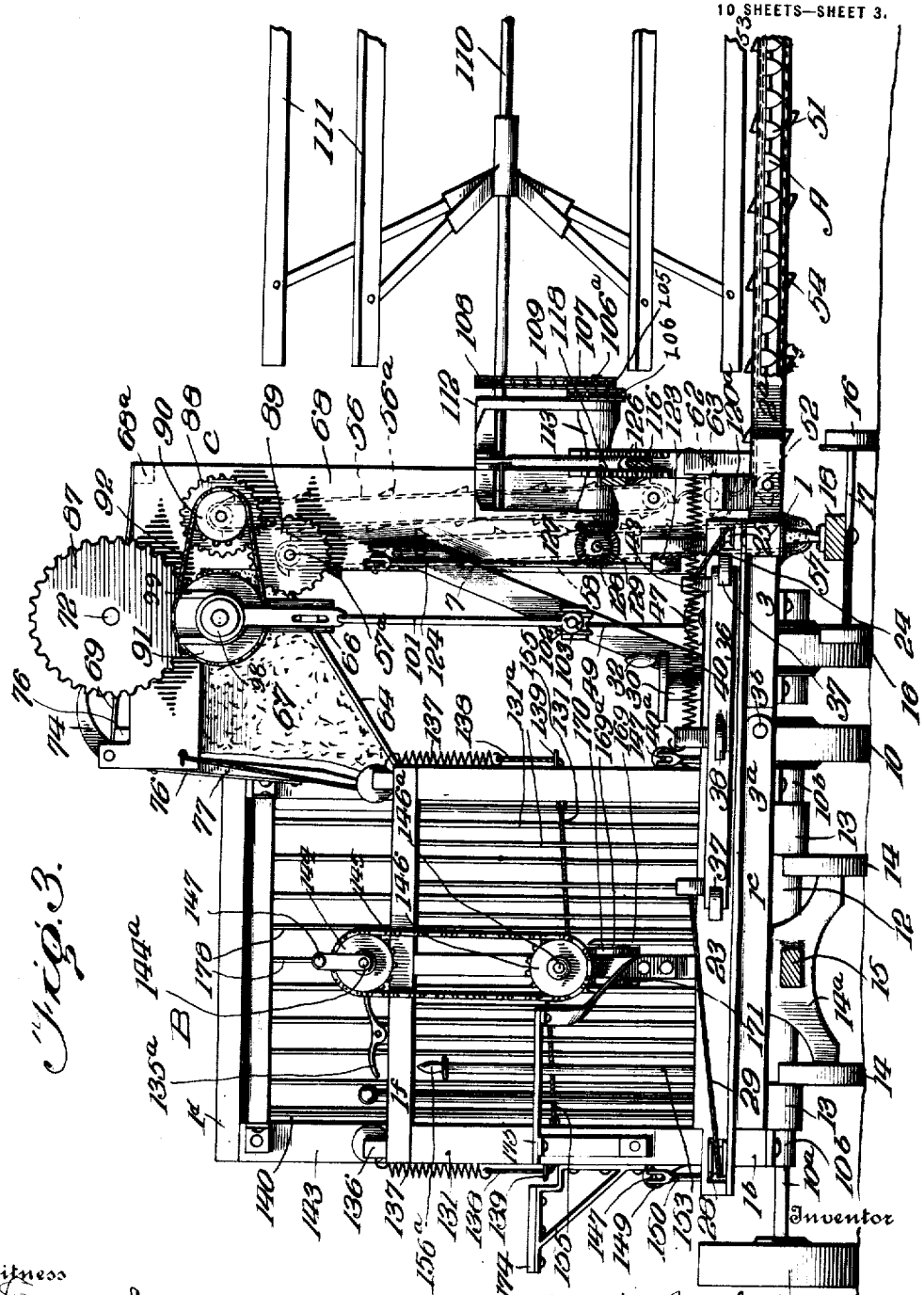

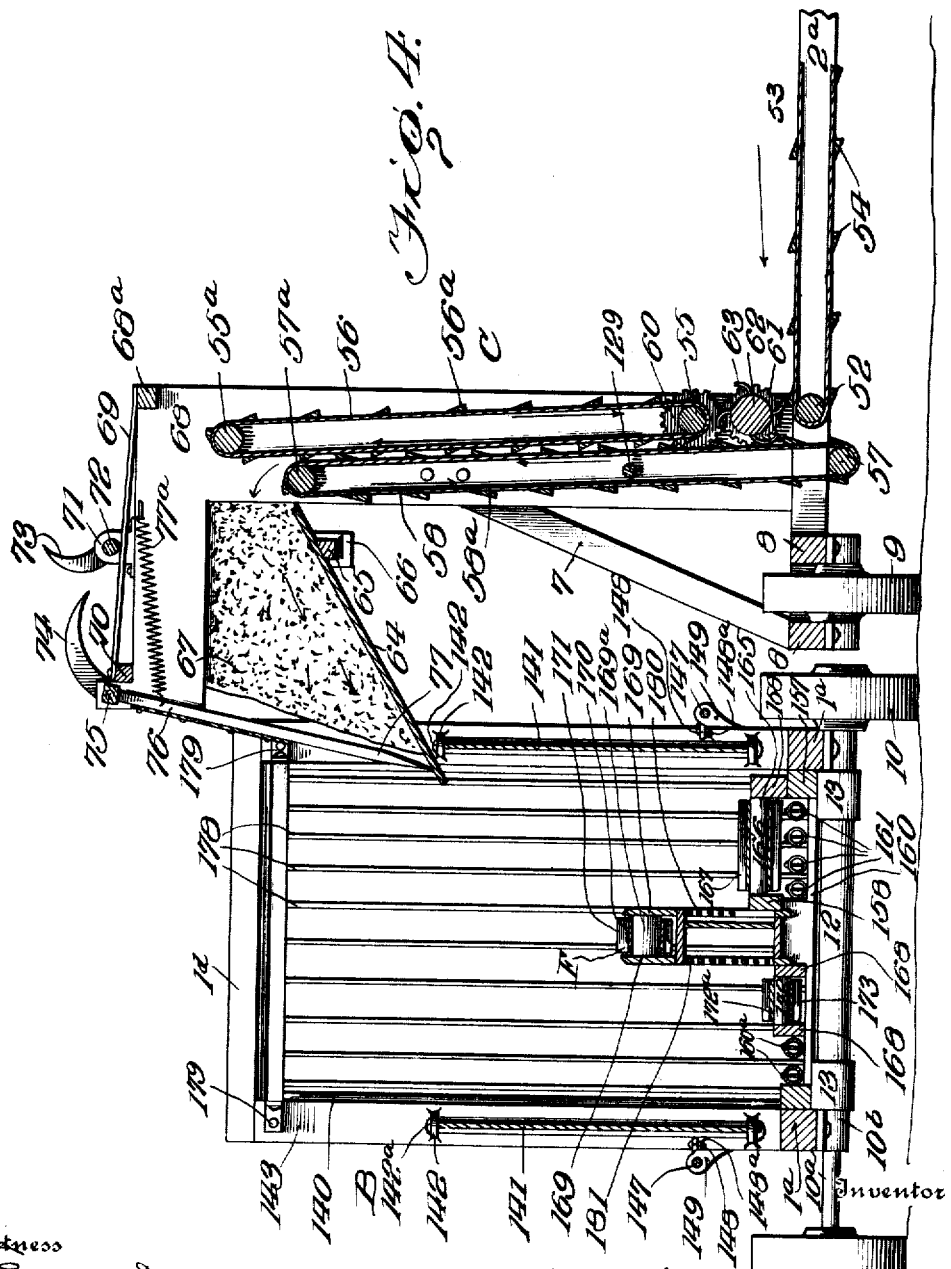

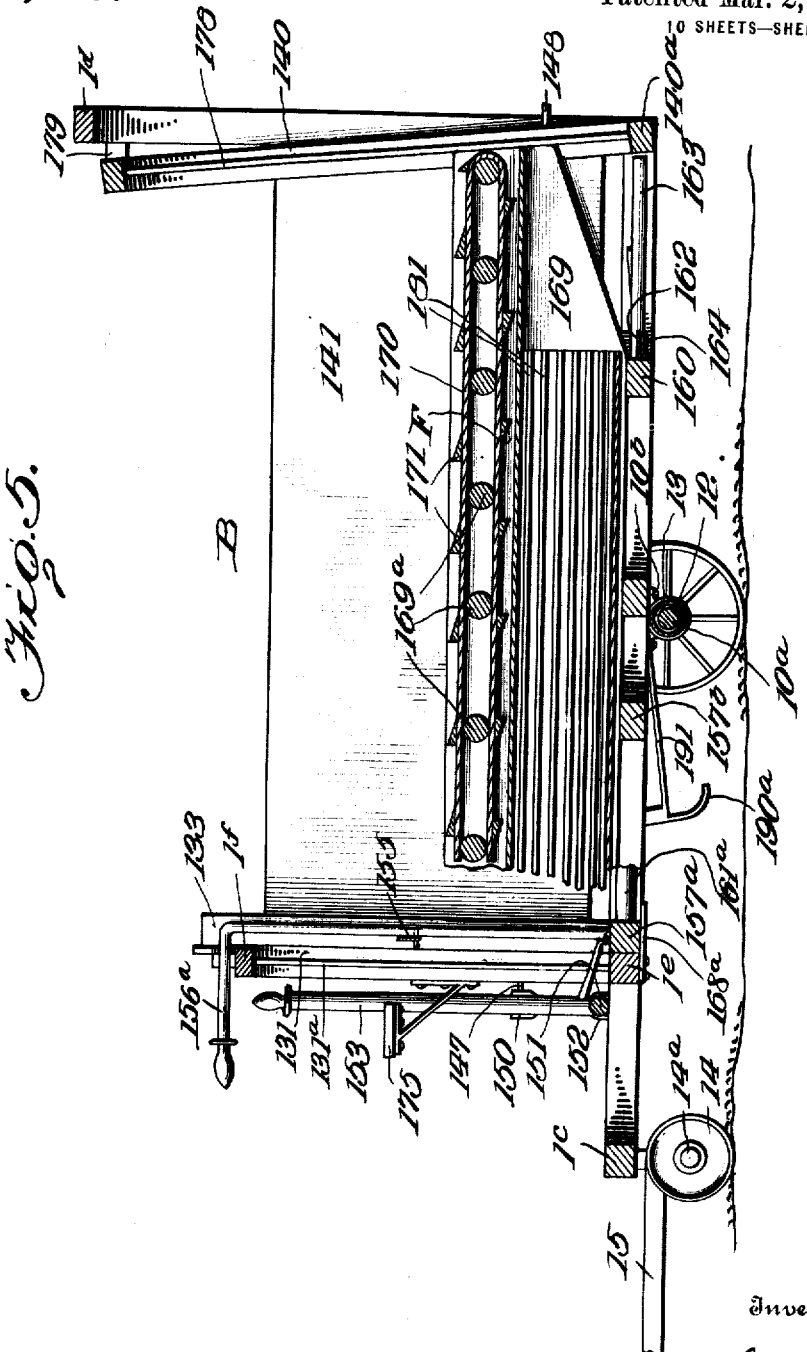

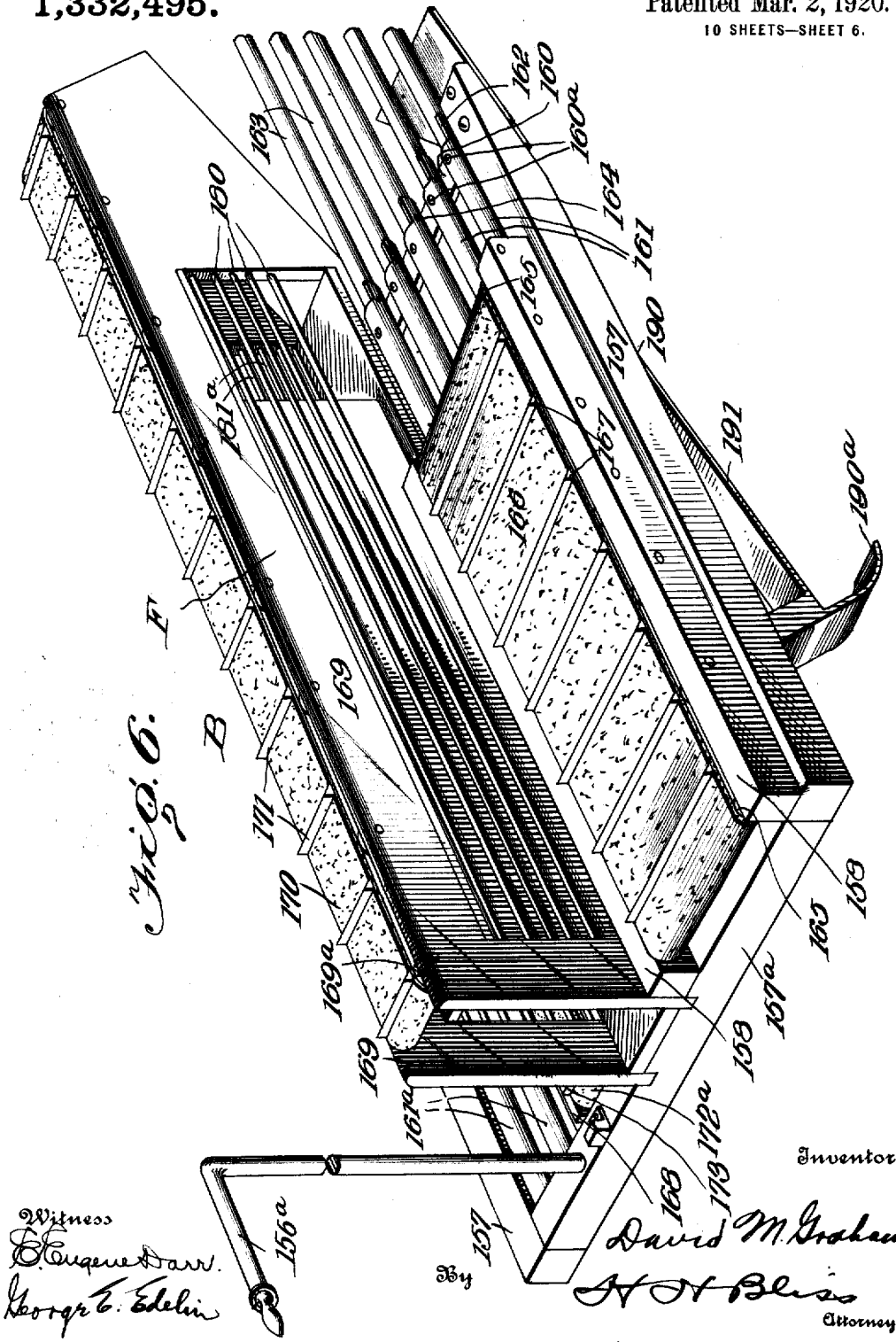

D. M. GRAHAM.
METHOD OF TREATING WHEAT AND THE LIKE GRAIN.
APPLICATION FILED AUG. 25, 1915. RENEWED MAY 24, 1919.
1,332,495.
Patented Mar. 2, 1920.
10 SHEETS—SHEET 7.
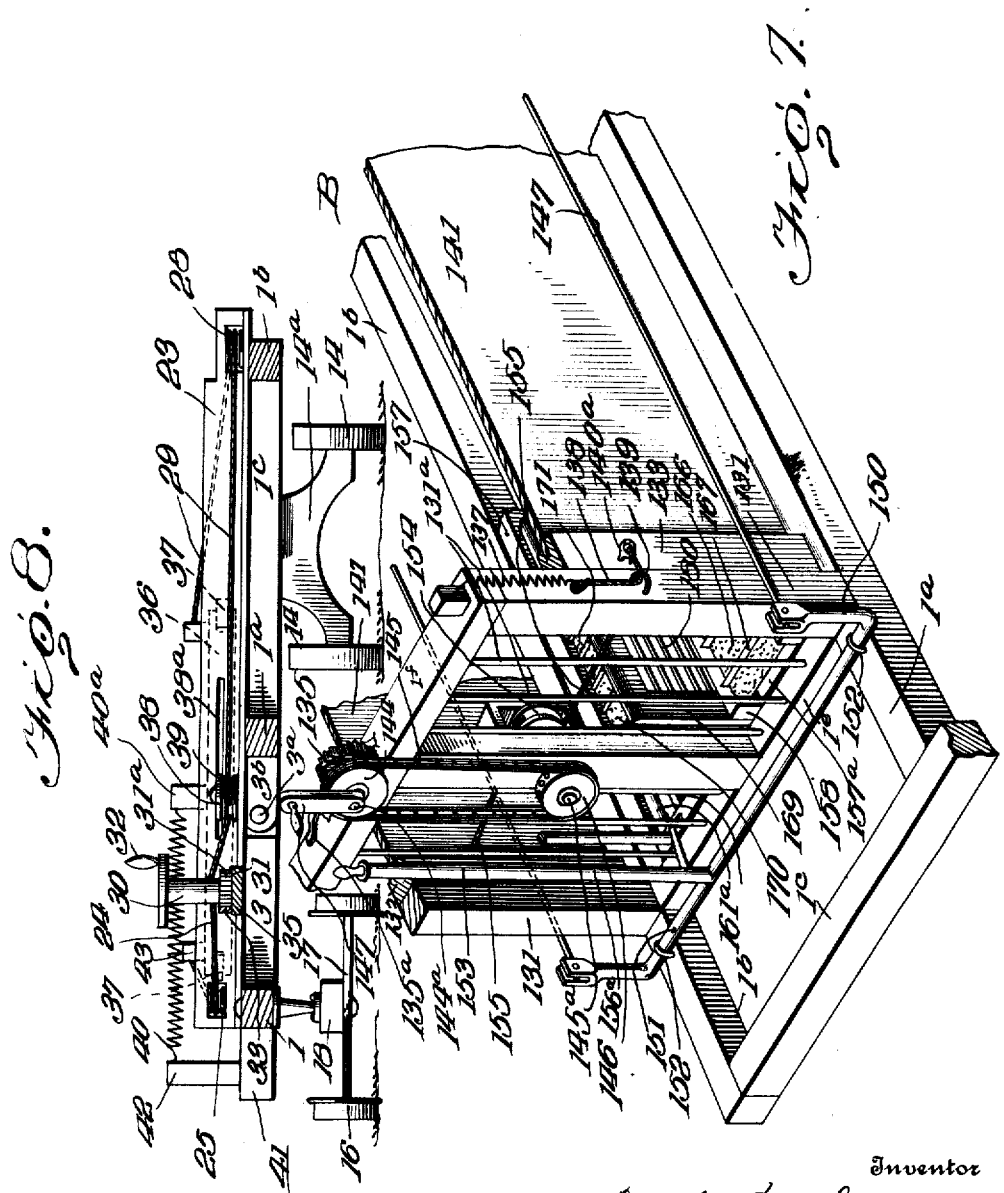
Inventor
David M. Graham
By H. T. Bliss
Attorney
Witness
E. Eugene Barr
George E. Edelin

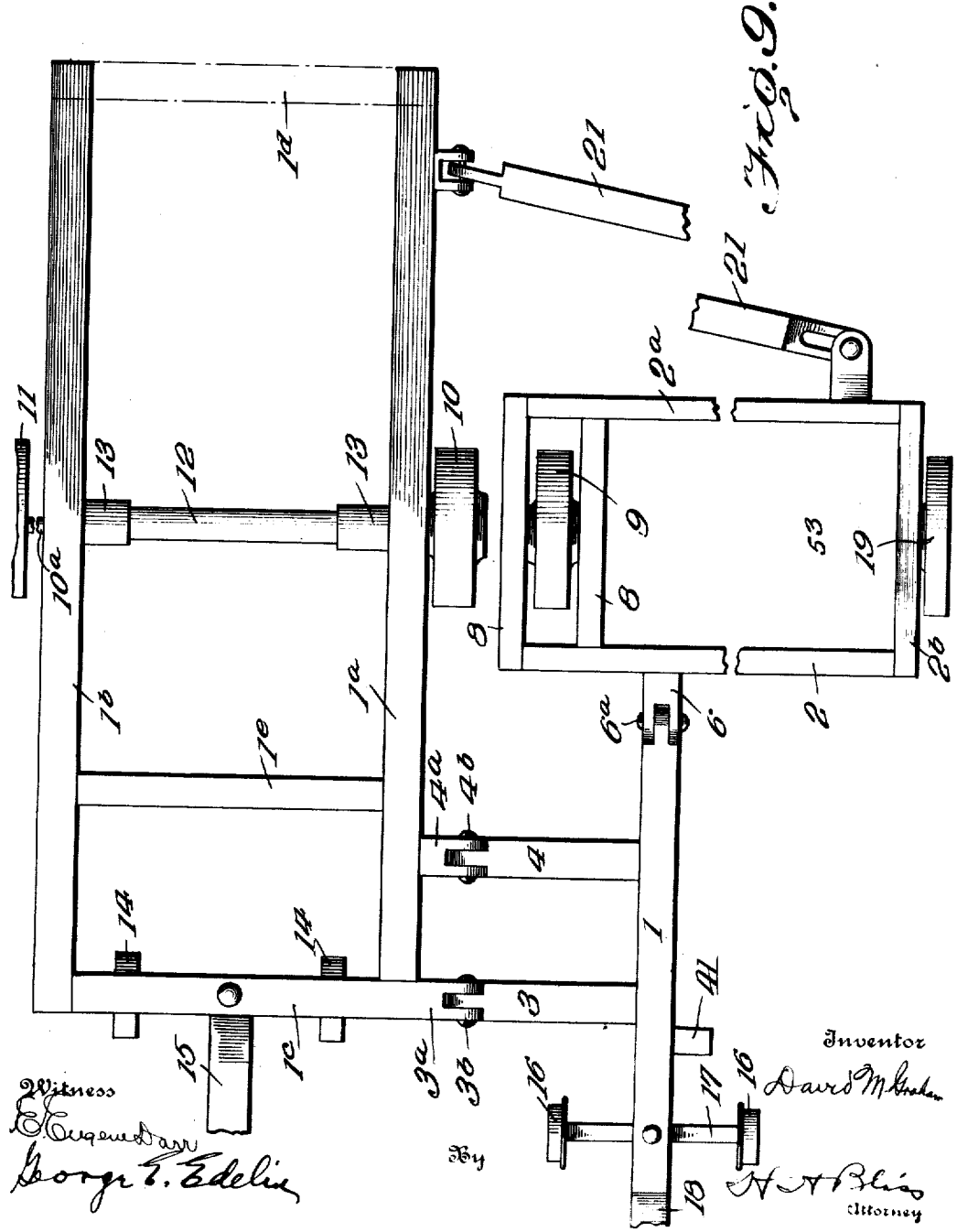

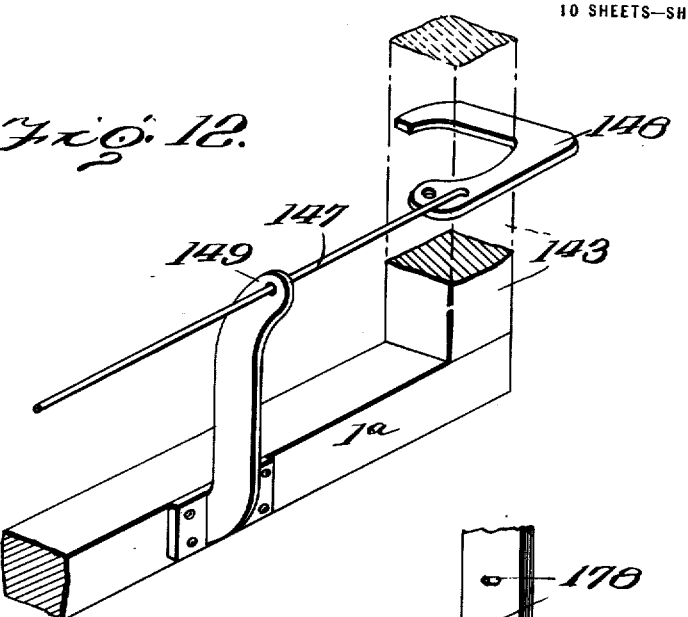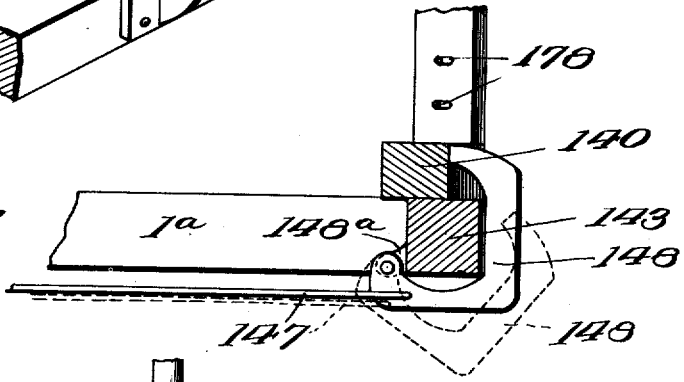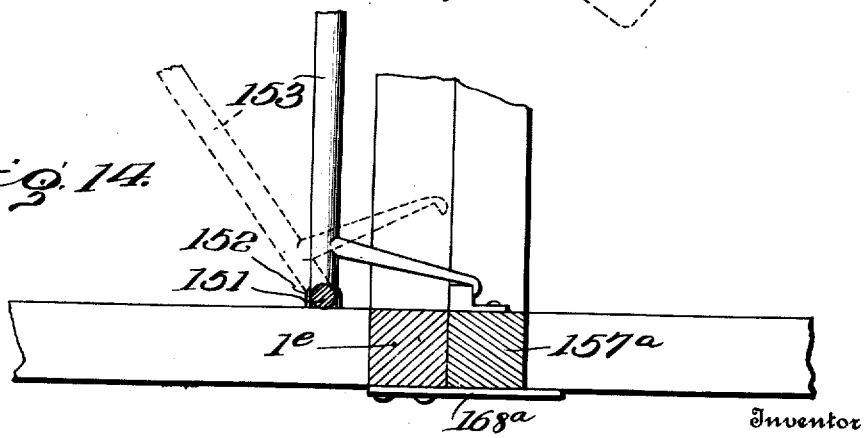

D. M. GRAHAM.
METHOD OF TREATING WHEAT AND THE LIKE GRAIN.
APPLICATION FILED AUG. 25, 1915. RENEWED MAY 24, 1919.

1,332,495.

Patented Mar. 2, 1920.

UNITED STATES PATENT OFFICE.

DAVID M. GRAHAM, OF BORDULAC, NORTH DAKOTA.

METHOD OF TREATING WHEAT AND THE LIKE GRAIN.

1,332,495.  Specification of Letters Patent.  Patented Mar. 2, 1920.

Application filed August 25, 1915, Serial No. 47,256. Renewed May 24, 1919. Serial No. 299,616.

*To all whom it may concern:*

Be it known that I, DAVID M. GRAHAM, a citizen of the United States, residing at Bordulac, in the county of Foster and State of North Dakota, have invented certain new and useful Improvements in Methods of Treating Wheat and the like Grain, of which the following is a specification, reference being had therein to the accompanying drawing.

This invention relates to a method of procedure, for the cutting, harvesting, storing, drying and curing of wheat and the like grain. The subject-matter upon which it is based, the objects and purposes at which I aim, are fully set forth hereinbelow, but a description first being given of one form of apparatus by which the invention can be carried out.

That apparatus is illustrated in the drawings, which are typical and more or less conventional in character; and therein:

Figure 1 is a plan view of a mechanism comprising parts which embody my mechanical improvements;

Fig. 2 is a side elevation from the grain side;

Fig. 3 is a front elevation;

Fig. 4 is a transverse section on the vertical plane of the line *x—x* of Fig. 2;

Fig. 5 is a longitudinal section of the straw-receiving and stacking apparatus taken on the plane of the line *y—y*;

Fig. 6 is a perspective of the bottom structure of the stacker apparatus;

Fig. 7 is a perspective showing part of the main frame of the stacker, together with some of the attached parts;

Fig. 8 shows some of the draft devices, the view being taken on the transverse plane of the line *z—z* of Fig. 1;

Fig. 9 is a plan view of the base frame elements and supporting wheels.

Fig. 10 is a perspective view of portions of one of the bottom tubular rack elements disassembled.

Fig. 11 is a longitudinal horizontal section of the same when connected together.

Fig. 12 is a perspective view of a portion of the end gate latches.

Fig. 13 is a plan view partly in horizontal section further illustrating the same.

Fig. 14 is an elevation partly in section of the means for securing the forward end of the stacker receptacle, and of a part of the devices for operating the end gate latches.

Figure 15:
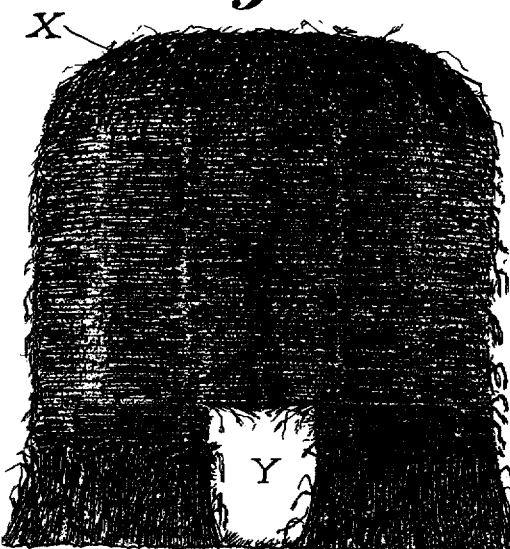
Fig. 15 is an end view of a stack of grain used in my method.

The apparatus, as an entirety, in the drawings, may be regarded as made up of four principal elements, namely, a cutting mechanism, indicated as a whole by A, a straw-receiving and stack-forming mechanism indicated by B, a transfer apparatus interposed between the cutter and the stacker and indicated as a whole by C, and a draft apparatus connected to and peculiarly correlated with both the cutter and the stacker and indicated as an entirety by D.

Referring, first, to the cutter apparatus, it comprises parts by which draft can be applied, a frame for supporting the cutting devices, and parts for connecting these to the stacker element and for carrying the various devices that constitute the cutter mechanism.

For illustration, I have shown a stub tongue at 1 which, at its front end, is flexibly connected to a fore truck to be described. At its rear end the tongue is pivoted to a platform frame having the front sill bar 2, the rear sill 2ª, a cross girt 2ᵇ at the outer end, and two cross girts 8, 8 at the inner end. This cutter frame is hinged to the tongue by an arm 6 extending forward from the frame and carrying the hinge 6ª.

Although the detail parts of the straw-receiving and stack-forming element will be more fully referred to hereinbelow, it may be here noticed that it is built upon a base frame comprising an inner sill 1ª, an outer sill 1ᵇ, a front cross girt 1ᶜ, and a rear cross bar or girt 1ᵈ, which, however, is at the top of the structure, and will be more fully described.

The two main frames (that of the cutter mechanism and that of the stacker) are flexibly connected, these frames having hinge arms at 3 and 4 and 3ª and 4ª, united by hinges at 3ᵇ, 4ᵇ.

9 indicates the bull wheel or wheel which, by traction from the ground, transmits power for the operation of the cutter apparatus and the reel. It is mounted between the girts 8, 8; and it may be noted that this and the other parts of the cutter apparatus may be substantially similar to the corresponding parts of an ordinary harvester.

The outer end of the cutter platform is supported upon the grain wheel 19, mounted upon the axle 19ª.

The fore truck has, as usual, two truck wheels 16 mounted upon the ends of an axle 17 to which is rigidly connected the tongue 18, this structure being joined by vertical hinge devices to the front end of the stub tongue.

The other main element B of the apparatus (the straw receiver and stacker) is mounted upon the inner ground wheels 10 and the outer ground wheels 11. An axle is indicated at 10ª and bearings at 10ᵇ.

The cutting apparatus has a sickle bar 51 and guard fingers at 51 which may be of any preferred sort. At 53 there is conventionally indicated the platform carrier on rolls 52 and provided with cleats or flights 54. This horizontal carrier delivers the cut straws to an approximately vertically arranged elevator supported in a framework which is carried by the inner end of the cutting apparatus. 56 and 58 are two endless aprons with flights 56ª and 58ª, the former mounted on a bottom roll 55 and a top roll 55ª, and the latter upon a bottom roll 57 and a top roll 57ª. These endless aprons are arranged suitably close together in order to maintain a lifting grip upon the stream of straws that is delivered to them at the bottom.

The element 56 of the elevator has its bottom roll 55 in a plane higher than the bottom of the other element 58. Immediately below the former there is mounted a feed roll 62 which is provided with a suitable number of curved fingers 63, curved reversely in relation to their direction of rotation. The straws pass below this roll and are pressed by its fingers against the inner apron 58 and there held until grasped by the lower end of the outer apron 56.

The inner apron 58 has its upper roller 57ª in a plane below that of the apron 56, so that there is a space left for the free delivery outward of the elevated straw. It falls from the elevators upon a chute 64. This chute, the upper rolls, and other parts at the top of the structure are supported in a framework having vertical parts 68, braces at 7, cross bars 68ª, 70, and a suitable number of cross braces. The parts 68 may be of sheet metal of sufficient strength and are shaped to have the vertical part and an outward extending arm portion. The chute 64 is supported on a cross bar 65 supported in brackets 66 depending from the upper part of the frame just described. At the lower end of the chute there is a gate having the upper part 76 and the fingers 77 supported on a rock shaft 75 and at its sides are canvas shields 67. This rock shaft carries a cam 74, and on a parallel shaft at 72 mounted in a bearing 71 there is a cam 73 adapted to intermittingly engage with the cam 74.

Power is transmitted from the bull wheel to the parts above described by any well known mechanism. On the shaft driven by the bull wheel gear there is a belt pulley 79 which, by belt 81, is connected to the pulley 80 on the shaft 57 of the apron 58. On the roller shaft there is a gear wheel 89 meshing with a gear wheel 88 on the shaft of the apron 56. On the shaft of the lower roller 55 of the apron 56 there is a gear wheel 60 meshing with the gear wheel 61 on the shaft of the fingered roll 62.

The shaft of the wheel 88 has a sprocket 90 which is connected by a chain 92, to a wheel 91, mounted on a stub shaft on the outside of the elevator frame. This shaft has a gear wheel meshing with the wheel 87 on the shaft 72 which carries the cam 73.

By means of these transmitting devices the elevators 56, 58 and the roll 62 are all actuated, and the cam 73 is rotated. At each rotation of the cam it impinges on the cam 74, opens the gate at 77, and holds it open long enough to allow the charge of straw which has accumulated on the chute 64 to pass down to the straw-receiving stacking mechanism.

After each opening of the gate, and when the cams 73, 74 disengage, the gate is returned to its closed position by the spring 77ª. 69, 69 are rack bars which are situated transversely of the machine and secured to the cross bars 70 and 68ª for preventing the escape of the straws upward.

The cutter bar is driven from the bull wheel by any ordinary transmitting device, including a crank and pitman mechanism.

110 indicates a reel shaft carrying the reel bars 111, this part of the apparatus being of any preferred or suitable sort. On the reel shaft there is a sprocket wheel 108 which, by chain 109, is connected to sprocket 107 on a shaft 106ª. This shaft also carries a sprocket 106 which, by chain 105, is connected to a sprocket 104 on shaft 127ª. The shaft 110 is mounted in a swinging frame 112 which is hinged at the axis of the shaft 106ª. This shaft in turn is mounted in a vertically swinging forward projecting frame having the bars 113 which are hinged at the axis of the shaft 127ª. 120ª is a supporting bar or beam extending forward from the base frame of the cutting apparatus. From it rise upward standards 117, 119, 121 and 125. 118 is a lever pivoted on the standard 119 and connected to an arm 121, which is joined to the frame 113, the lever having a ratchet and segment lock; and by means of it the reel supporting structure can be moved up or down around the axis 127ª.

116 is a lever mounted at the upper end of the standard 117 and connected by a link 115, which in turn is pivotally connected to the mounting of the shaft 110; and by this lever 116 the reel shaft can be adjusted outward or inward as desired. Levers 116, 118 are locked in ratchet segments at 126.

To tilt the cutter platform and frame and throw the cutter bar down or up, use is made of a lever 123 pivoted at the upper end of a standard 125 and adjustably locked by a ratchet segment at 122, the lever being connected to a link 124 which, at its upper end, is pivoted to the elevator frame at a relatively high point.

128 is a bevel wheel on the end of shaft 129 which meshes with the bevel wheel 127 on the shaft 127$^a$. Shaft 129 at the opposite side of the elevator carries a sprocket 83, which, by chain 84, is connected to sprocket 85 on the countershaft of the bull wheel gearing.

By the parts last described the positions of the cutters, the rocking of the cutter frame cast by the throwing of the lever 123 is permitted by the hinge at 6$^a$ which connects the stub tongue 1 with the hinge arm 6 of the frame.

The frame is flexibly connected to the straw receiving and stacking frame by a brace link 21 extending from the outer end of the cutter frame to the rear end of the stacker.

The gate opening mechanism is thrown out of action by the shifting lever 101 having a fork 99 engaging with the hub of the wheel 91 and adapted to draw the clutch element 94, having teeth 94$^a$, out of engagement with the clutch element 93 connected to the gear wheel which drives the cam shaft. And it is thrown into action by means of the spring 97 around the extension 96 of the clutch shaft, having an abutment 98 at its outer end. The lever 101 is operated by means of the cable 49 which extends from the end of the lever backward around a cable sheave 102 mounted at 103 on the brace 7, and then extends forward to a pedal lever 48 near the driver's seat 47.

The straw delivered from the chute 64 falls into a receptacle forming part of the stacker element.

The sill bars 1$^a$, 1$^b$, as above stated, are joined by bottom girts 1$^c$ and 1$^d$. 143 are relatively long uprights or posts at the rear ends of the sills, and 131, 131 are relatively shorter posts or uprights near the front ends of the sills. The rear posts are connected at their tops by the cross girt 1$^d$, and the front posts are connected by the girt 1$^f$. Thus there is a four-sided vertical frame at the front end of the straw-receiving receptacle and a three-sided frame at the rear, the bottom of this frame being open.

The front end of the base frame is supported upon a truck having two wheels 14, the axle 14$^a$ and the tongue 15, situated below the front girt 1$^e$ and connected thereto by a vertical pivot. At a cross line near the middle, longitudinally, of the base frame the aforesaid axle 10$^a$ is mounted for the wheels 10 and 11, this axle, as stated, being mounted in the bearings at 10$^b$ secured to the under side of the sills. Between the sills are rollers 13 spaced by or mounted on the tube 12. Each roller 13 carries an anti-friction roller bearing.

Upon these rests the straw receptacle and stacking device, proper. This is composed of a longitudinally and vertically movable bottom structure, together with longitudinally stationary but laterally movable side walls, and a longitudinally swinging rear wall or gate.

The main parts of the side walls are indicated by 141. Each is secured at its front end to a vertically arranged, loose, and movable bar 133, and at its rear end is connected to the main frame by a vertical hinge rod 142$^a$ held by brackets 142 connected to the rear posts 143.

The swinging rear wall or gate comprises a rock shaft 177 mounted in brackets 179, at the tops of the rear posts, side bars 140, a bottom cross bar 140$^a$, and vertically arranged spaced rods 178. This gate normally tends to swing forward, and is locked in its closed position; but when unlocked can be pushed and swung backward by the load in the receptacle. It is locked by the catch devices at 148, each pivoted to a bracket 148$^a$. The latches are opened by pull rods 147 in brackets 149 extending forward at the sides of the machine and connected to the cranks 150 of a rock shaft 151 mounted in bearings 152 on the sills 1$^a$, 1$^b$, just in front of the receptacle. 153 is a lever arm rigid with the rock shaft 151 and extending up to a point where it will be accessible to an attendant. When he rocks the lever 153 forward the rods 147 open the catches 148 and the rear gate is free to swing backward.

The front wall of the receptacle is preferably a rack having the vertically arranged spaced rods 131$^a$ fastened in the bottom girt 1$^e$ and the top girt 1$^f$.

The front ends of the side walls are positively drawn inward, but are free to be returned by springs. 155, 155 are cables attached to the inner sides of the bars or posts 133. 154 is a winding drum to which the inner ends of the cables are attached. The shaft 145$^a$ of this drum is mounted in an upright in the front wall, and carries at its outer end a sprocket 146, which, by chain 145, is connected to sprocket 144 on a shaft 144$^a$ at the top of the frame. This shaft has a locking ratchet 135 with which a spring held pawl 135$^a$ engages. 147 is a crank on the shaft 144$^a$. The attendant, by means of these devices, can, through the cords 155, draw the inner ends of the side walls inward. They are automatically returned by the springs 137 fastened at 136 and each of which is, by a cable 138, connected at 140ª to the outer side of one of the bars or posts 133, the cable passing through a deflecting guide at 139.

The bottom structure of the receptacle and stacker is formed with a bottom frame having the side sills 157, the front girt 157ª, a rear cross bar 160, and intermediate girts 157ᵇ. 158, 158 are longitudinally arranged bars. In these are mounted rollers 165 in a horizontal series. Upon these rollers there is arranged an endless carrier 166 carrying flights or attachments 167. This carrier system extends from the front end of the receptacle to a transverse line at or near the center, longitudinally. As shown, it is on the inner side of the bottom structure, that is to say, is disposed between the central longitudinal vertical plane and the inner side wall 141.

Along the outer side of this bottom structure for the receptacle there are longitudinal bars 168 in which rollers 172 are mounted in a horizontal series, and upon these there is a canvas 172ª carrying cleats or flights 173. This carrier system is narrower than that at 166 on the inner side. A space is left between the outer wall 141 and this outer carrier 172ª. This unobstructed space is provided for an attendant who stands within the receptacle for purposes to be described.

Between the carriers there is a longitudinally arranged structure the purpose of which is to completely separate the inner part of the straw mass at the bottom from the outer part, the separation being maintained after the mass is deposited on the ground, and is intended to permit free access of currents of air, as will be set forth. 169, 169 are plates or boards arranged vertically and secured to the base frame part. They extend a relatively long distance upward from the bottom planes. Along their upper edges is mounted a series of rollers 169ª, and upon these is arranged an endless belt 170 carrying flights or teeth 171.

To reduce the frictional resistance to the straw along the surfaces of the vertical parts 169, they are cut away over as wide an area as possible and the metal rods 181 and 181ª are arranged longitudinally in the cutaway spaces. This air-space-former is arranged longitudinally and centrally between the side walls 141.

161 are rack elements, such as bars, or, preferably, tubes, secured at 160ª at their rear ends to the rear cross girt 160, and at their front ends secured to the intermediate girt 157ᵇ. These tubes are cut away at 162, and in the rear end of each there is inserted an extension 163, preferably a tube, of smaller diameter, and secured by a pivot 164, the rear fingers 163 being adapted to rock, within limits, in the ends of the tubes.

The rack system having these relatively short bars or tubes 161 is in the longitudinal vertical planes of the carrier systems 166 and 172ª.

Along the outer wall 141 there are similar, but longer, rack bars or tubes 161ª which extend from the rear cross girt 160, to which they are attached, forward to the front cross girt 157ª of the base frame. It is upon these that the attendant is supported while he remains in the receptacle.

On the under side of each of the side sills 157 there is an inclined roller track bar 191. 190 indicates a support which carries the forward end of one of these, and 190ª indicates a stop device.

At the front end the movable bottom structure rests upon a support 168ª secured to the stationary frame. At the rear ends of the sills 157 there are plates 159 which furnish a wide support when the rear end of the bottom structure settles down upon the ground, these acting as shoes and preventing the bar parts from sinking below the ground surface.

Draft is applied to the front of the cutter frame and also to the front of the straw receiving and stacking frame. The main or governing line of draft is not directly at the center of either of these. The two mechanisms require, under ordinary conditions and circumstances, four draft horses. These are hitched to the swingletrees 46. As above described, there is, under the front end of the stacker frame, that is, under the sill 1ᶜ, a truck having a tongue 15, cross axle 14ª and wheels 14. One of the extreme swingletrees 46 is outside of this tongue 15 and the one at the opposite extreme is outside of the tongue 18. The two intermediate swingletrees are between the tongues 15 and 18. These swingletrees are pivotally connected to double trees 45. The double trees are in turn flexibly connected to the ends of the evener bar 44. This, at its center, is connected to the draw bar 38, which is rigidly fastened to a transverse bar 36. This bar has at its ends rollers 37, 37 bearing horizontally backward against a vertical flange or rib 23 which rises up from a metal angle bar 23ª which is secured to the front cross girt 1ᶜ of the stacker frame. On the ends of this angle bar are mounted two grooved cable sheaves 25 and 28. The bar 38 extends backward from a transverse bar 36 and passes through a slot 38ª in the upright rib or flange 23 and at its rear end carries a pulley 39 behind the rib or flange 23. 30 is a winding drum mounted on support 31 at a suitable place on the frame, as, for instance, on a short longitudinal bar 35, and provided with a handle 32 within reach of the driver in his seat 47. 24 and 29 are cables secured to this drum and adapted to wind thereon in opposite directions. Cable 24 extends from the drum to the front side of pulley 39, thence toward the outer side of the stacker frame to pulley 25, thence back to a fastener at 43 on the outer end of the cross bar 36. Cable 29 extends in the opposite direction from the winding drum 30 around a pulley 28, and thence to the other end of the cross bar 36. 33 is a pawl and 31ª is a ratchet wheel on the axis of drum 30. 34 is a foot trip accessible to the driver for releasing the pawl 33. 33ª is a spring normally tending to hold the pawl in engagement with the ratchet.

The operator can, from his seat, operate the drum 30 in such way as to cause the bar 38 to move outward toward the stubble side of the machine. 40 is a spring fastened to an abutment 42 on arm 41 and also fastened at 40ª to the transverse sliding bar 36, or a suitable part of the sliding frame. If the draft devices are away from their innermost position and if the operator by the trip 34 should release the dog 33, the spring 40 will return them to their innermost positions. The necessity for such a draft adjusting device in a combined stacker and harvester will be explained below.

The manner of operating an apparatus of the sort which I have shown and described will be readily understood.

The object, generally considered, is to radically change the manner of handling, disposing of, storing, curing, and treating, newly cut grain-carrying straws. And in order to briefly, but clearly, present, by way of contrast, the results which I accomplish, they can be compared with the steps now universally taken, in the harvesting of wheat, oats, and other grain straw, on the one hand, and hay, alfalfa, and the like, on the other hand.

For present purposes, the universal practice, as concerns the cutting, storing, curing and threshing of grain-carrying straws is as follows: Harvesting and binding machines are used, each comprising a cutting apparatus, a conveying mechanism upon which the grain falls as it is cut and a binding apparatus to which grain is taken by first elevating it and then allowing it to descend, somewhat, to a binding table. While on this table predetermined approximately uniformly sized masses are separated from the stream and each of these, after being tightly compressed, is surrounded by a strand of twine drawn from a ball. When the encircling twine band is completed it is severed, and the two ends are knotted together.

The tightly bound bundles pass from the machine to the bundle carrier, about one bundle to ten feet of travel, and after four or five are accumulated they are thrown to the ground as the machine moves along over the field, and these bundles are subsequently gathered up to form shocks, some eight or ten bundles to the shock. For an understanding of the average it may be stated that there will be ten bundles in each shock, and that the shocks are at the corners of parallelograms each fifty feet long and from fifteen to twenty feet wide, although, of course, in practice, there may be considerable variation from this average.

As to matters of economy, the factors to be considered are:

First, in machinery: The first cost of the binding apparatus to the farmer; the vast amount of capital tied up in binding apparatus, in harvesting territories, the liability of delicate parts to get out of order, with the liability of consequent loss during the working season while waiting for repairs, and the cost of repairs constantly needed;

Second, the cost of binding twine: Assuming twelve cents per pound, the average cost per acre can be considered as about fifty cents for twine; for forty acres, twenty dollars; for a quarter section, eighty dollars; for a section of land, three hundred and twenty dollars.

As is well known, there are, in the wheat-growing territories, numerous farms which handle three thousand acres of wheat per year; in such cases there is an expense neighboring upon fifteen hundred dollars for twine for that quantity of wheat land. Then, when one considers the vast acreage of oats, barley, and other cereals which are harvested in a way similar to that followed in harvesting wheat, there is appreciation of the fact that, according to the Agricultural Department statistics, the annual expense incident to the farmers of the United States is fifteen millions of dollars.

Third, the loss incident to preventing access to the stubble land for plowing and preparing for the next crops; this is, of course, not calculable with exactitude; but the vastness of the amount will be appreciated from the data. The tightly bound bundles (produced by the binder) after shocking, stand, each with its straws compacted tightly together, and the eight or ten tightly packed together in a shock in thousands of shocks, a few feet apart, scattered over the ground, until the time for threshing. The period during which they so stand is always one of several weeks, and generally one of several months.

The wheat territories may, from the standpoint of storing and threshing, be divided into two classes. The first includes those territories where the wheat is planted and harvested in small field lots, each say of from forty or less acres, up to those of one hundred acres. In many regions of small fields the wheat is allowed to stand in the shocks for a number of weeks, and is then brought to and stored in barns or mows. In other regions of small fields it is allowed to stand in the shocks until it is assumed to be sufficiently dried and cured, and then it is piled in larger stacks, until the time for threshing. It cannot be brought immediately from the harvester to the mows or to the large stacks because of the necessity for curing the grain and the straw, this involving the drying or evaporating of the moisture, during which period there is danger of over-heating, which is well known as being incident to newly cut grain, and creates a liability of self-firing where it is stored in mows or masses in large stacks.

Now, even in the regions where the fields are small in acreage the stubble land is not available for plowing or cultivating for a relatively long period after the time of harvesting.

In wheat-growing regions of the other class the fields are much larger, running from one hundred acres each to six hundred and forty acres, and from there to several square miles in area.

In such regions the practice is, universally, as above described; that is to say, shocks of eight or ten bundles are immediately formed, and are allowed to stand upon the ground, sometimes for months, until the time, or opportunity, for threshing arrives. While the shocks so stand the farmer has no opportunity for plowing the stubble land, although for many years it has been recognized as a great desideratum to be able to immediately commence the plowing for the next crop after the harvest. For example, in the vast wheat belt in the northwestern parts of the United States the harvesting may be regarded as closed from the first to the tenth of September. But the threshing is seldom finished before the latter part of October or the first of November. This leaves but a few days, in the fall of the year, for plowing after the removal of the shocks. Hence, the great majority of the plowing must be done in the spring.

A six hundred and forty acre section can be regarded as requiring three gang plows and twelve horses for forty days for plowing. There is no such period allowed in the fall of the year after the threshing, over widely extended territories.

My system and mechanism for harvesting and storing the grain cleans up the stubble land at once and enables the farmer to commence his plowing at least as early as September, and in a large amount of acreage he can commence in August.

Fourth. And again, when the time for threshing arrives (always some weeks, and generally some months, after the grain has been cut and shocked) it becomes necessary to transport the bundles of the shocks long distances in order to bring them to the threshing apparatus. It is not practicable to move the ordinary threshing mechanism over a large field territory from point to point; and it therefore becomes necessary, vice versa, to bring the bundles over such territory to the thresher. It is conservative to state that if a threshing machine is stationed at any point in a one hundred acre wheat lot, a vehicle which brings the bundles from the shocks to the thresher must travel at least one hundred and fifty miles a day. Generally, there are eight or ten vehicles each traveling from twelve to fifteen miles per day. From this one can appreciate the labor involved, the work performed, and the expenditure made, in the mere matter of haulage from scattered points over the field to the threshing machine. It generally demands, in the wheat section of the northwest, the work of from ten to twelve farm vehicles, twenty horses, and from twelve to sixteen men each day that a threshing machine is at work.

My system of harvesting and storing the grain is intended to radically modify this earlier practice.

Two operatives accompany the machine, one for driving, steering and attending to the team, and the other for observing the delivery of the straw, disposing it as it is received in the receptacle, and forming and delivering the stack sections. One rides on the seat 47, the other, during the earlier stages of forming a stack, rides in the receptacle, standing on the longer rods 161$^a$ at the outer side of the machine; and, during the last period of forming the stack, he stands upon the running boards or platforms 174, at the side, and 175 at the front.

The parts having been properly adjusted, the cutting of the standing grain commences. As the straws fall backward from the cutter bar they are received on the platform carrier 53, are carried by it to the lower ends of the aprons 56 and 58, are pressed by the fingers 63 on the rollers 62 into the space between the two vertical carriers, and by the latter are elevated to planes above the roller 57.

If wheat be had in mind, the height of the stalks is generally from twenty to thirty-six inches. I prefer to sever the straws in such way as to have them eighteen inches long from the heads down. The cutting apparatus is tilted by means of the lever 123 and the link 124 to effect the cutting at the desired length.

When the machine starts its operation the line of draft, applied by the draft devices and the evener 44 to the draw bar 38, is approximately in the midway vertical plane between the centers of dead resistance from the two main elements of the apparatus, to wit, the cutting mechanism and the stacker mechanism. But as the grain rapidly increases the weight, and therefore the load, on the stacker side of the apparatus, it is necessary to shift the line of draft gradually toward the stubble side. This is done by the operator in the seat 47 who rotates the winder at 30 in such way as to draw the draft bar 38 outward. After each adjustment the spring at 33ª causes the detent 33 to engage its ratchet and lock the draft bar against retraction. I have found that under ordinary circumstances a lateral adjustment of the line of draft of from twenty to thirty inches is necessary.

It will be seen that flexibility is necessary as concerns the connection of each important part of the apparatus with another; that is, between the draft device and the main framework; between the draft and the cutter frame; and between the cutter frame and the stacker frame. The draft animals can be turned to the right or to the left, and the steering wheels in front of both elements of the mechanism assist in securing a quick turn. The stacker frame can follow uneven surfaces of the ground below it more or less independently of the movements of the cutter and elevator frame, and vice versa. The outer end of the cutter frame and the rear end of the stacker frame are properly held by the flexible connecting brace 21.

The accumulator (comprising the chute 64, the gate 76, 77, and the side walls at the upper part of the elevator) can be used in either of two ways, according to circumstances.

This is to say, first, the gate can be held open during the entire time that a load is being delivered to the stacker receptacle and closed only when the stack mass is being delivered from the receptacle to the ground. For so holding open the gate the pull device is provided which is accessible to the operative in the stacker; and at such time the clutch at 94ª is held open. The chute and gate are then used merely to accumulate the straw of the stream continuously rising from the cutters during the interval of a few seconds when the load is being emptied.

Or, on the other hand, the accumulator can be used to form a series of charges successively delivered from the elevator to the stacker receptacle, thus allowing the attendant (who is occupied in properly disposing the straws) opportunity to properly place the straws of one charge before another charge is delivered. At such times the closing spring 77ª is left free to normally close the gate and the clutch at 94ª is closed. When the parts are so adjusted there will be a regular recurrence of the opening and closing of the gate 77, these movements being timed with the lineal travel of the machine. The driving chain gear at 90, 91 and 92 can be constructed to provide different speeds and time intervals for the operation of the accumulating and bunching devices to correspond with the volume of grain which is being cut and elevated.

When the grain is standing in good condition it is the second method of use just referred to that I follow. The straw is delivered in bunches from the accumulator to the interior of the stacker. The attendant, who stands therein, arranges the straws as he sees fit.

The superior plan for arranging the straws is as follows: The attendant takes the first loose bunch, places it at the inner rear corner of the wagon chamber with the heads turned inward (to lie adjacent to the air-space-former) and butts outward. This about fills the rear end of the right-hand side of the receptacle to the top of the space former, which I will indicate as an entirety by F. The succeeding bunches or charges of loose straws he places with their butts downward and resting against the straws first placed in the corner. He continues this arranging of the straws (with the butts downward and the heads upward) from the rear end, or tailgate, to the front end wall on the inner side. He then places a bunch at the rear outer corner with the straws horizontal and heads inward against the space-former, and fills the intermediate and forward portion of the stacker chamber on the outer side in the way above described for filling the inner side.

He has now built up a bottom layer or stratum of upright straws which extend up to within a few inches of the top of the air-space-former. He then fills the remainder of the room at the sides of the space-former with horizontally disposed straws, butts outward. Then he stacks or arranges them across the tops of the air-former, continuing the placing of layers (as uniformly butts - outward - and - heads - to - the - center as possible) until he reaches the tops of the side walls. These are generally supplemented by canvas wings or shields, which practically extend the side walls as retainers. The best dimensions that I have so far found for the chamber in the stack are: length ten feet, width five or six feet, height five to seven feet.

During the time that the straw is being disposed and packed in this chamber the front ends of the side walls are drawn inward by the drum 154 and the cables 155, horizontally, laterally, the chamber will taper or widen rearward.

By the time the mass of straw in the chamber has reached or approached the top of the side walls the attendant leaves the interior and stands upon the board 174 from which he can still effect the manipulating and placing of the straws at the top.

After sufficient straw has been received in the receptacle to form a mass of the predetermined depth the gate tripping devices at 74, 74 are thrown out by disengaging the clutch 94ª, and the straws of the rising stream are allowed to temporarily accumulate in the buncher. Then the stacker attendant, stepping to the platform 175, releases the crank shaft 144. Thereupon the springs 137 immediately draw the forward ends of the side boards outward, relieving the straw mass of pressure and friction at the sides.

Then this attendant releases the bottom lock or catch 153ª and simultaneously opens the latches 148 behind the tail gate, by rocking the shaft 151 through lever 153.

The stacker receptacle 1 at all places behind the ledges or shoulders 168ª rests upon the axle 10ª, or upon the rollers 13, which in turn bear on the axle. The center of gravity of the load is in, or approximately in, the vertical plane of the axis of the axle. I aim to have the gravity so distributed that when the load of straw is completed its center of gravity will be slightly in the rear of this plane.

Consequently, when the catch 153ª is open, the rear end of the stacker receptacle begins to gently swing downward; and, as the latches 148 have been opened the tail gate is free to swing backward under the pressure of the load. The downward movement of the rear end of the bottom structure continues until the rack fingers 163 strike the ground, the rear part of the straw mass resting upon them. When they contact with the ground they swing up somewhat on the pivots 164. By this time the bottom of the straw mass, has, over a large area, come in contact with the ground surface, a powerful gripping friction is caused, and the whole mass is held practically stationarily, without forward dragging, on the ground. This downward swinging of the rear end of the bottom structure brings the track bars 191 to the horizontal, or with their forward ends slightly above the horizontal, and the whole bottom structure is free to move backward over the axle; or, vice versa, the main frame structure of the stacker is free to move forward under the straw receptacle. The latter occurs, and the forward movement of the axle relatively to the straw mass continues until the stop arms 190ª, 190ª are reached. In the meantime the rear end of the straw mass has been securing a firm grip on the ground. As soon as the axle impinges on the stops 190ª the forward motion of the main frame suddenly tugs at the movable bottom structure and it is quickly drawn out from under the straw. The endless aprons 171 and 172 (which, by means of their cleats 167, 171 and 173, engage quite firmly with the bottom part of the straw mass) permit the bottom structure to move out from under the straw with the resistance reduced to minimum.

As soon as the bottom structure is free from the straw the attendant grasps the handle of the lever 156ª and draws downward upon it. This tends to overbalance the bottom structure in the opposite direction. When it is unloaded, the front part in advance of the vertical plane of the wheel axis is heavier than the rear part, the weights of the parts being selected and arranged with this in view, that is to say, to have the front end heavier when the stacker is empty. When it is loaded there is a considerably greater quantity of straw at the rear end because of the divergence of the side walls toward the rear. After the attendant has given a downward pull on the lever 156ª the inclined track 190ª insures that the bottom structure shall move relatively forward again and come to the position where it rests upon the shoulders at 168ª. After this it is again locked by the latch at 153ª; and the tail gate, which has followed the bottom structure back to its closed position, is locked by the latches 148.

These operations of releasing the stack receptacles, its settling down, its being drawn out from under the stack, and its returning to position for another load, all take place in from twenty to twenty-five feet of lineal travel of the machine.

Figure 16:
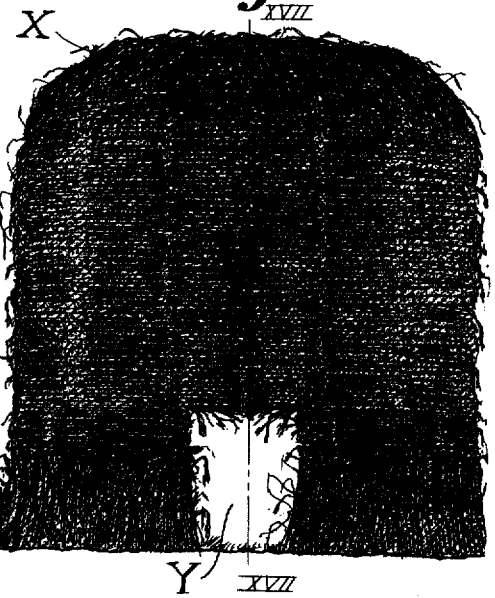
Fig. 16 is a section of the same on line XVI—XVI of Fig. 17.
Figure 17:
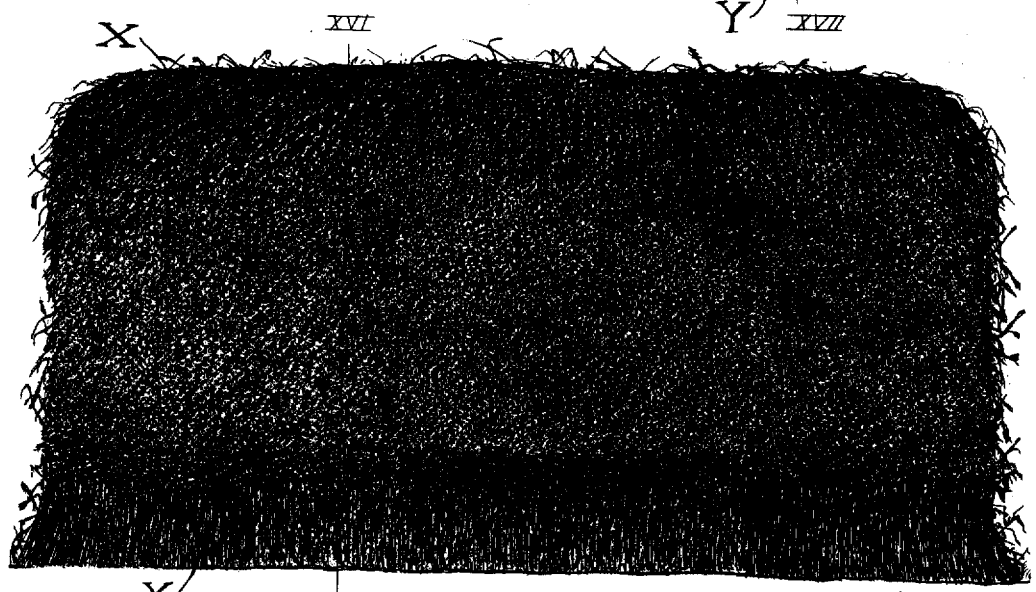
Fig. 17 is a section of the same on line XVII—XVII of Fig. 16.

The stack X which is formed is illustrated in Figs. 15, 16 and 17.

The space which was occupied by the former F is now an open air chamber or flue Y extending from the front side of the stack practically under it entirely to the back. In earlier machines which I have devised I formed an air space in the stack which had inclined sides that converged at a sharp angle toward the top. I found this inferior in that the straws tend to crowd together and close up more or less of this air passage.

When a space-former such as that herein shown, and indicated by F, is used, an air chamber is produced which, at any place, in vertical section, presents a sharply defined rectangle. And this insures the maintaining of the air passage open indefinitely.

Throughout the greater part of the bottom of the stack the lower layer or stratum of straws all stand with their butts to the ground except a few at the rear end of the stack which have their butts turned outward but with their heads inward and adjacent to the air space where they are protected from the elements and are situated so as to be fully ventilated and cured.

The straws around the air space are so disposed that, not being tightly bound by twine or otherwise, the air can readily move laterally, horizontally, and also vertically upward from this air chamber and circulate with freedom through the mass.

A stacking mechanism of the sort shown and described herein is of such dimensions that it can carry the cuttings of one hundred and sixty rods of lineal travel of the apparatus. This enables the farmer to select that portion of the field where he wishes the grain to be stored during its drying and curing, and where it can be readily delivered directly to the thresher. He then lays out the "rounds" for the machine, so that as it approaches the selected area where he wishes all of the grain to be stacked, the attendant, at the termination of each round, (whose length is determined by the load to be obtained) trips the mechanism above described in such way as to deliver the stack in said area.

The different loads or stack sections can be delivered substantially continuously along some predetermined line across, or in selected sections of, the field. If the grain is already dry and approximately cured these loads or sections of a stack can be placed relatively close together. But if the grain is in less favorable condition the loads can be arranged on a broken line, or "staggered", so as to expose the sides and ends to access of the air, and yet be in a restricted area, as above specified, so that the greater part of the field area is cleaned up and ready for plowing.

I have above directed attention more particularly to wheat in order to convey a clear understanding of the mechanism and the mode of its use. It will be understood, however, that any cereal-carrying straw which is harvested by the ordinary harvesting and binding machines can be cut and handled in the way described, such as oats, flax, barley, and the like. And I have also found that other materials which do not require as much care in manipulation can be also harvested and stored to great advantage by an apparatus embodying my improvements; such as hays of the ordinary species, alfalfa, or the like. For hay or alfalfa the machine is used in substantially the same way as above described; the cut grass or stalks, if properly disposed in the receptacle, around and over the air-space-former, and when the machine reaches a predetermined area of the field a stack is formed, which when made in the way described will dry and cure with results much superior to those obtained when the plan is followed of leaving the freshly cut materials lie upon the ground and then gathered into small piles or shocks and finally in the larger stacks.

With regard to my improved method of harvesting cereal grains it may be added that heretofore grain has been bound into bundles and shocked with the bundles leaning inward against each other. In some instances this procedure would incidentally leave air spaces between the bundles, but such air spaces had no influence or usefulness in connection with the grain berries and did not modify or hasten or improve the sweating and curing of the berries, because the berries were in the heads of the bundles and top of the shock and exposed to the air, so that no sweating, further growth, maturing and increase of weight and value was attained. Nothing but a drying out of moisture took place, and this was intended, in order that there might be no injurious heating in a stack or barn in case such grain was not to be threshed from the shock. Sometimes such bundles and shocked grain was, after a thorough drying, stacked in the field or mowed away in the barn and left for a month or six weeks, before threshing. Great particularity as to the dryness of the grain before stacking or mowing it had to be exercised in such cases, because if it were not sufficiently dried in the field before stacking or mowing the sweating in the mow or stack would go too far and the grain would heat (even to the point of combustion) and "mow burn" so that the quality, grade and value was greatly reduced, sometimes to the point of killing the germ so that it would be unfit for seed, or of rendering the berries unfit for use as food. After such preliminary drying little or no benefit could be derived from the sap in the cut grain straws.

But when my method is followed the grain is cut so that the sap holding straws remain attached to their berries and it is stacked in the field as it is cut with almost all of the grain berries inclosed within the stack together with the naturally attached sap-containing straws, so that they begin to sweat or ferment immediately on the formation and deposit of the stack; but, the grain being newly cut and having considerable sap and moisture in it, I modify and control such sweating so that excessive heating with its evil results does not occur, and this I perform by causing air to be distributed through the stack, as by forming a ventilating air space or passage in the berry-inclosing stack by which sufficient free air is supplied and moisture is taken away, so that the sweating extends only to the desirable extent.

Under such conditions the berries will continue to mature and improve in grade by taking up plant food from the straws, in which the sap and moisture present at the time of cutting has been preserved, so that an action, probably fermentive or chemical, takes place, known as sweating, by which nutriment continues to be transferred from the cut straws to the berries. The heat generated in the thicker part of the stack is not allowed to rise to an injurious degree to interfere with this continued growth of the berries, because the heated very hygroscopic and moist air in those parts of the stack where heating and sweating begins rises through the interstices of the stack and takes away heat and moisture and keeps down excessive temperature. This rising air draws in and is replaced by drier and cooler air which is freely supplied from the ventilating air passage which has been formed in the lower part of the stack, and this fresh air acts in a similar manner throughout the stack wherever it penetrates, and removes heat as it is further generated. An injurious degree of heat is thus continually prevented while the lesser degree of heat accompanying the sweating, growth and maturing of the berries is permitted.

By my method not only are great quantities of grain berries prevented from being scattered and lost, and much labor saved, as already explained, but a perfect curing is effected within two or three weeks after stacking in the field and the grain has then attained its maximum maturity, grade and value and is ready for threshing.

The stack should be constructed of such shape as to be stable; and in order to secure the best results, the stack mass and the stack-ventilating space should be of such relative sizes that the sweating, heating and maturing of the berries shall take place, but shall be restrained as described and prevented from increasing to an injurious extent. I have discovered by practical experience in the harvest field that a suitable and convenient size of stack for the purposes described is about six to seven feet high, six feet wide and ten feet long, with the air space or passage Y about twenty-six inches high. The air space may be of such width as does not prevent the stability of the stack. I have found that a width of eight inches is sufficient for the described ventilation. I do not intend however that my improvement is limited to or by the dimensions stated.

I do not in this application present any claim relating to apparatus for carrying out the method which is claimed. But said apparatus is believed to be novel and patentable and the stack former is claimed in my application Serial No. 97,298, filed May 13, 1916, as a division hereof.

What I claim is:

1. The herein described method of harvesting and stacking grain-carrying straws of wheat or the like for storing drying and curing the same in the open air, it consisting in cutting the straws of the standing grain, immediately packing the cut straws while unbound and loose around an interior former at the bottom of the mass and within an exterior former, arranging a bottom layer of the loose or unbound straws in approximately vertical position with their butts downward, arranging strata or layers of other loose unbound straws above the unbound straws of the bottom stratum until the height determined on for the stack is reached, causing the straws to settle in the said exterior former and more or less interlock with each other around the interior former, then depositing the said stack on the ground and withdrawing the former and separating the formers therefrom, causing the butts of the lower stratum to stand upon the ground, and maintaining an air flue through the mass corresponding to the said interior former until the grain is cured.

2. The herein described method of harvesting and stacking grain-carrying straws of wheat or the like for storing drying and curing the same in the open air, it consisting in packing the straws while newly cut and while loose and unbound around an interior former at the bottom of the mass, forming a bottom layer or stratum of such straws with their butt portions arranged to contact with the ground, arranging strata or layers of other loose unbound straws above the said loose bottom stratum until the determined height of the stack is reached, causing the straws adjacent to the interior former to settle and pack around the same while loose and unbound, then bringing the bottom of a part of the said mass into contact with the ground and separating it partly from the exterior former, then separating it entirely from the interior former and from the exterior former, and maintaining an open air chamber at the bottom of the mass corresponding to the interior former until the grain is cured.

3. The herein described method of harvesting and stacking newly cut grain-carrying straws of wheat and the like for storing drying and curing same in the open air, it consisting in forming a mass of nearly cut straws while loose and unbound, arranging at the bottom of a mass over a confined horizontal area a stratum of said straws with their heads upward and with their butts downward around an interior former at the bottom of the mass and within an exterior former, then arranging strata or layers of other loose unbound straws above the said stratum with those of the upper strata having their butts turned outward, continuing the piling of the upper strata to the determined height of the stack, causing the straws while loose and unbound to settle upon and interlace or engage with each other around the interior former, then depositing the said stack mass on the ground and withdrawing the formers, and after their withdrawal maintaining an air chamber through the mass corresponding to the interior former until the grain is cured.

4. The herein described method of harvesting and stacking grain-carrying straws of wheat or the like for storing drying and curing the same in the open air, it consisting in cutting the straws while standing, forming sub-masses or bunches of the said straws while loose, separating the said bunches or sub-masses successively from each other, arranging the straws of each bunch or sub-mass, then forming a stack of the loose straws of the said bunches successively while still unbound, piling strata or layers of the said straws while loose around an interior former and within an exterior former until the height determined for the stack is reached and arranging the said straws to have the majority thereof lie with their butts outwardly relatively to the central part of the stack, causing them to interlace or pack around the interior former, to form an air chamber longitudinally through the stack, withdrawing the said formers and depositing the stack upon the ground as set forth, and maintaining the said air space open until the mass is dried and cured.

5. The method of preparing wheat berries while they are on the straws, for threshing, consisting in cutting the standing straws at such height as to cut off with the heads sap-containing sections of the straws, then before withdrawing moisture, forming a stack of the straws and berries while unbound in their native loose condition, inclosing the greater part of the berries within the stack mass and preventing rapid loss of the native sap and permitting the grain to sweat and mature by the aid of such sap, forming a stack ventilating air passage through the stack, whereby the sweating and temperature are prevented from increasing to an injurious extent.

6. The method of sweating and curing grain to increase the weight and grade and market value thereof and make it ready for threshing, which consists in forming a stack of the grain berries and unbound sap-containing straws as they are harvested, so that the greater part of the grain berries are inclosed within the stack among the straws, forming a stack-ventilating air space through the stack as said grain is being cut and stacked, and sweating and curing the grain in the presence of natural air currents through the interior of the stack until it is ready for threshing, whereby the curing is materially improved and hastened.

In testimony whereof, I affix my signature, in presence of two witnesses.

DAVID M. GRAHAM.

Witnesses:
N. CURTIS LAMMOND,
GEORGE E. EDELIN.

It is hereby certified that in Letters Patent No. 1,332,495, granted March 2, 1920, upon the application of David M. Graham, of Bordulac, North Dakota, for an improvement in "Methods of Treating Wheat and the like Grain," an error appears in the printed specification requiring correction as follows: Page 10, line 108, claim 3, for the word "nearly" read *newly;* and that the said Letters Patent should be read with this correction therein that the same may conform to the record of the case in the Patent Office.

Signed and sealed this 13th day of April, A. D., 1920.

[SEAL.]

M. H. COULSTON,
*Acting Commissioner of Patents.*

Cl. 56—1.